(12) United States Patent
Landmer

(10) Patent No.: US 9,108,152 B2
(45) Date of Patent: Aug. 18, 2015

(54) DRY SCRUBBER SYSTEM WITH LOW LOAD DISTRIBUTOR DEVICE

(71) Applicant: ALSTOM Technology Ltd, Baden (CH)

(72) Inventor: Per Hakan Fredrik Landmer, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 155 days.

(21) Appl. No.: 14/090,078

(22) Filed: Nov. 26, 2013

(65) Prior Publication Data

US 2015/0147237 A1    May 28, 2015

(51) Int. Cl.
| | |
|---|---|
| *B01D 53/83* | (2006.01) |
| *B01D 53/86* | (2006.01) |
| *B01D 53/88* | (2006.01) |
| *B01D 53/50* | (2006.01) |
| *F23J 15/00* | (2006.01) |
| *F23L 13/02* | (2006.01) |
| *F23L 13/06* | (2006.01) |

(52) U.S. Cl.
CPC .............. *B01D 53/86* (2013.01); *B01D 53/508* (2013.01); *B01D 53/88* (2013.01); *F23J 15/003* (2013.01); *F23L 13/02* (2013.01); *F23L 13/06* (2013.01); *B01D 2251/404* (2013.01); *B01D 2258/0283* (2013.01); *B01D 2259/128* (2013.01); *F23J 2215/20* (2013.01); *F23J 2219/60* (2013.01)

(58) Field of Classification Search
CPC .......... F23J 15/003; F23L 13/02; F23L 13/06
USPC ................. 422/176, 139, 143, 168, 169, 220; 423/244.01; 96/150
See application file for complete search history.

(56) References Cited

U.S. PATENT DOCUMENTS

| | | | | |
|---|---|---|---|---|
| 4,610,849 | A * | 9/1986 | Van Camp et al. | 422/176 |
| 7,850,936 | B2 * | 12/2010 | Levasseur et al. | 422/168 |
| 8,518,353 | B1 * | 8/2013 | Neathery et al. | 422/168 |
| 8,715,600 | B1 * | 5/2014 | Gayheart | 422/168 |
| 2013/0095018 | A1 * | 4/2013 | Pilats | 422/140 |
| 2013/0294992 | A1 * | 11/2013 | Fiedler | 422/168 |
| 2014/0086797 | A1 * | 3/2014 | Petty | 422/109 |

FOREIGN PATENT DOCUMENTS

WO    WO 97/37747    10/1997

* cited by examiner

*Primary Examiner* — Jill Warden
*Assistant Examiner* — Joye L Woodard
(74) *Attorney, Agent, or Firm* — Rita D. Vacca

(57) ABSTRACT

An air quality control system (AQCS) 14 useful for treating flue gas FG, such as flue gas FG produced by a fossil fuel fired boiler 12 is described. The AQCS 14 is equipped with a dry scrubber low load distributor device 66. With the low load distributor device 66, flue gas FG flow through a dry scrubber reactor 36 is stabilized under varying plant 10 load conditions to maintain AQCS 14 stability, efficiency and effectiveness.

15 Claims, 5 Drawing Sheets

DRY SCRUBBER SYSTEM WITH LOW LOAD DISTRIBUTOR DEVICE

FIELD OF THE DISCLOSURE

The present disclosure is generally directed to a dry scrubber useful for processing a gas stream, such as a flue gas stream produced by a fossil fuel fired boiler, a combustion process or the like. More particularly, the present disclosure is directed to a circulating dry scrubber (CDS) dry flue gas desulfurization (DFGD) system operable under low load conditions using a reducing agent low load distributor device operable for dry or moistened reducing agent distribution across a reduced flue gas stream flowing thereby.

BACKGROUND OF THE DISCLOSURE

In treatment of flue gas, dry flue gas desulfurization (DFGD) systems are known. In DFGD processes, lime (CaO) is first converted to hydrated lime ($Ca(OH)_2$) before being placed in contact with the flue gas to be treated. The hydrated lime is placed in contact with the flue gas as a dry or moistened powder within a circulating dry scrubber (CDS) DFGD system. An example of such a CDS DFGD system is the ALSTOM NID™ system (ALSTOM Power Inc., Paris, France) (NID).

WO 97/37747, invented by Stefan Ahman et al., discloses a device for a CDS DFGD system useful for discharging and distributing an absorbent material in a flue gas duct. Accordingly, in a vertical flue gas duct for flue gases containing gaseous pollutants, a discharging and distributing device is arranged to discharge and distribute a particulate absorbent material reactive with the gaseous pollutants in the flue gas to convert the gaseous pollutants to a separable dust.

While methods and equipment capable of removing both particulate and gaseous pollutants from a flue gas stream exist, there remains a need for improved DFGD methods and equipment that operate under low load conditions while maintaining system stability, efficiency and effectiveness.

SUMMARY

The present disclosure provides an air quality control system (AQCS) comprising an ALSTOM NID™ system (NID) dry flue gas desulfurization (DFGD) system or like system operable using a dry or moistened powder reducing agent, such as calcium oxide or calcium hydroxide. The subject AQCS system uses a NID DFGD system or NID like system equipped with a low load distributor device used in combination with a fabric filter (FF) to treat flue gas for the removal of sulfur dioxide, and like particulate and gaseous pollutants therefrom. The use of dry or moistened powder calcium oxide or calcium hydroxide is desirable due to lower capital investment requirements and associated operating costs as compared to wet flue gas desulfurization (WFGD) systems or spray dryer absorber (SDA) DFGD systems that operate using an aqueous lime slurry. While the present disclosure is directed to DFGD using a NID system or NID like system in combination with a FF, the teachings of the present disclosure are equally applicable to other particulate collection systems, such as using an electrostatic precipitator (ESP) for particulate removal. However, for purposes of clarity and simplicity, the present disclosure is directed to an exemplary embodiment of a DFGD NID system equipped with a reducing agent distribution device equipped with a low load distributor device useful for distribution of reducing agent in a flue gas during plant operation under low load conditions, in combination with a FF particulate collection device, to achieve system stability, efficiency and effectiveness under both regular and low load conditions.

The AQCS of the present disclosure comprises a gas duct through which flue gas FG produced by a combustion process within a boiler flows for treatment prior to release to the atmosphere via a stack. Arranged in the gas duct, is an inlet damper to a NID DFGD system. The NID DFGD system comprises a flue gas dry scrubber or reactor and a reducing agent distribution device equipped with a low load distributor device, fluidly connected to a reducing agent supply and a water supply. The reducing agent supply may be in the form of a tank or other suitable container for reducing agent storage. The water supply may be in the form of a tank, a piped water source, or other suitable source for water storage and/or supply. Fluidly connected downstream to the reactor is a FF for removal of particulate matter from the flue gas prior to the resultant cleaned flue gas release to the atmosphere through a stack. As noted above, an ESP may be used in the place of or in addition to the FF for removal of particulate matter from the flue gas prior to the cleaned flue gas' release to the atmosphere through a stack. Using the subject AQCS equipped with a NID DFGD system and a FF module, dirty flue gas laden with particulate and/or gaseous pollutants, such as for example, $SO_2$, $SO_3$, HCl, HF, fly ash particulates and/or like acidic contaminants, enters the AQCS through a single inlet damper for cleaning. As the flue gas passes through the inlet damper and into the NID dry scrubber, a moistened reducing agent from a reducing agent supply is uniformly dispersed across a horizontal cross section of the NID dry scrubber through which the flue gas flows. The moistened reducing agent reacts with the flue gas acidic gases, i.e., $SO_2$, HCl, $SO_3$ and/or HF, and the reacted moistened reducing agent is dried by the flue gas to create a dry reacted particulate by-product. The dry reacted particulate by-product is then captured within the FF module or like particulate removal device of the AQCS. The captured dry reacted particulate by-product is collected in fluidly connected hoppers and fed back to the reducing agent supply before again being uniformly distributed within the NID dry scrubber. The "cleaned" flue gas CG leaves the FF module through a fluidly connected gas duct fluidly connected to a stack for cleaned flue gas CG release to the atmosphere.

Like most traditional FF, the present AQCS uses a FF sectioned into multiple integrated components. By having multiple integrated components, an operator may isolate one or more individual integrated components for maintenance while keeping the remaining integrated components in operation. Likewise, one or more individual integrated components may undergo "turn down" during periods of low demand/low load/low gas flow/low contaminant output, so as to limit or avoid needless equipment wear, energy consumption and like operation associated costs.

During periods of low demand, overall power plant efficiency dictates reduced plant production or turn down. Such periods of reduced plant production are referred to as the plant operating under "low load" conditions. Under low load conditions, less fuel is combusted in the system boiler and less flue gas is produced. With the production of less flue gas, less flue gas enters the reactor thereby risking unstable reactor operation and potential reducing agent "fall out". Reducing agent fall out occurs when the reducing agent/flue gas dust column above the distribution device's disperser plate is unstable resulting in reducing agent fall out from the flue gas rather than the reducing agent being picked up and entrained in the flue gas for reaction and collection in the FF particulate collector. To stabilize flue gas flow through the reactor during plant low load operation, the distribution device is equipped with an extendable and retractable distributor device. Under low load conditions, the extendable and retractable distributor device extends outwardly toward the center of the reactor from beneath the distribution device's disperser plate. Extending the distributor device outwardly toward the center of the reactor reduces reactor area for flue gas flow thereby stabilizing the lessened flow of flue gas through the reactor. During regular or relatively higher demand periods, when the plant is operated under regular or relatively higher load conditions, the extendable and retractable distributor device is retracted into a position beneath the disperser plate of the distribution device for a stable reducing agent/flue gas dust column within the reactor. Depending on plant load, the distributor device may be positioned to extend outwardly from the disperser plate, to retract beneath the disperser plate, or any desired position therebetween to stabilize the reducing agent/flue gas dust column within the reactor. Accordingly, regardless of plant load conditions the subject AQCS with a NID DFGD system equipped with a low load distributor device of the present disclosure maintains system stability, efficiency and effectiveness.

In summary, the present disclosure provides an AQCS for treating flue gas produced in a combustion process to produce cleaned flue gas that comprises a moistened reducing agent distributor device operable to extend outwardly from a distribution device disperser plate within a dry scrubber reactor to reduce area of flue gas flow through the dry scrubber reactor when operated under low load conditions and operable to retract inwardly beneath the distribution device disperser plate within a dry scrubber reactor to increase area of flue gas flow through the dry scrubber reactor when not operated under low load conditions. As such, the distributor device is operable to extend and retract from beneath the disperser plate supported within opposed side edge channels formed in an interior of opposed elongated side edge support arms. Optionally, the disperser plate may include one or more openings therethrough for flue gas flow and/or the distributor device may include one or more openings therethrough for flue gas flow. According to another embodiment, the distributor device is supported by a plurality of support arms rotatably fixed to an axil, wherein the distributor device is operable to extend and retract from beneath the disperser plate by rotation of the plurality of support arms about the axil. The subject distributor device is operable manually, electronically, pneumatically or driven by a distribution device motor.

A method of maintaining flue gas flow stability within a dry scrubber reactor under differing load conditions comprises arranging a moistened reducing agent distributor device within a dry scrubber reactor operable to extend outwardly from a distribution device disperser plate to reduce area of flue gas flow through the dry scrubber reactor when operated under low load conditions and operable to retract inwardly beneath the distribution device disperser plate to increase area of flue gas flow through the dry scrubber reactor when not operated under low load conditions. As such, the distributor device is operable to extend and retract from beneath the disperser plate supported within opposed side edge channels formed in an interior of opposed elongated side edge support arms. Optionally, the disperser plate may include one or more openings therethrough for flue gas flow and/or the distributor device may include one or more openings therethrough for flue gas flow. According to another embodiment, the distributor device is supported by a plurality of support arms rotatably fixed to an axil and operable to extend and retract from beneath the disperser plate by rotation of the plurality of support arms about the axil. The distributor device is operable manually, electronically, pneumatically, or by a distribution device motor.

Additional features of the present air quality control system with low load distributor device will be apparent from the following description from which the subject exemplary embodiment is set forth in detail in conjunction with the accompanying drawings.

BRIEF DESCRIPTION OF THE DRAWINGS

The subject air quality control system with low load distributor device is disclosed in more detail below with reference to the appended drawings wherein.

DETAILED DESCRIPTION

Figure 1:
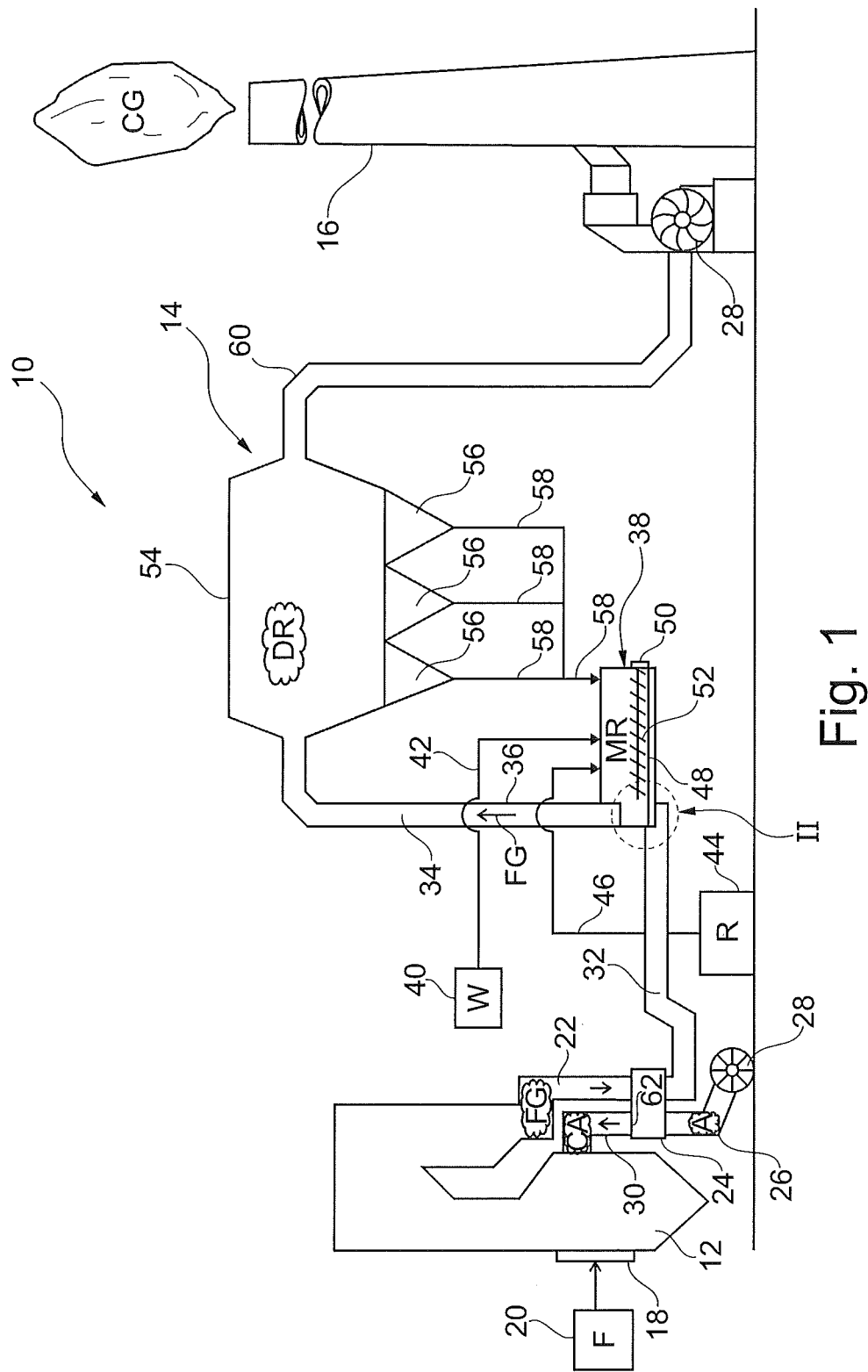
FIG. 1 is a schematic view of a plant with an air quality control system for cleaning flue gas from a combustion process.

A plant 10 in accordance with the subject disclosure as illustrated in FIG. 1, includes a boiler 12, an air quality control system (AQCS) 14 and a stack 16. It is noted that many additional and varied process steps using additional equipment may take place or be positioned between boiler 12 and AQCS 14, as is known to those skilled in the art. Likewise, many additional and varied process steps using additional equipment may take place or be positioned between AQCS 14 and stack 16, as is known to those skilled in the art. Such additional process steps and/or equipment are not described in further detail herein for purposes of clarity and simplicity.

As noted previously, FIG. 1 illustrates schematically a plant 10 with an AQCS 14 for cleaning dirty flue gas, FG, produced by a boiler 12 operative for fuel F combustion therein. As such, fuel F is supplied to boiler 12 through fuel inlet 18 from a fluidly connected fuel source 20. Fuel F may be a coal, natural gas, or other like fossil fuel. Hot flue gas produced by the combustion of fuel F in boiler 12 contains $SO_2$, $SO_3$, HCl, HF, fly ash particulates and/or like acidic pollutants. The hot flue gas flows from boiler 12 through a fluidly connected gas duct 22 fluidly connected to an air preheater 24. Air preheater 24 is used to transfer heat from the hot flue gas FG to air A supplied through a fluidly connected duct 26 from a fluidly connected fan 28. Air A supplied to the air preheater 24 is heated by the hot flue gas FG prior to flow from the air preheater 24 through a fluidly connected duct 30 and into the fluidly connected boiler 12 as combustion air CA. Optionally, a portion of combustion air CA produced by the air preheater 24 may be diverted and used for purposes other than combustion according to plant 10 needs. Likewise, one or more fans 28 may be used in the plant 10 for transport of flue gas from the boiler 12 through to stack 16.

From air preheater 24, flue gas FG flows to a fluidly connected gas duct 32. Gas duct 32 has a vertical portion 34 comprising a dry scrubber or reactor 36. In reactor 36 within vertical portion 34 is a distribution device 38. Distribution device 38 introduces, in a manner such as that disclosed in WO 96/16727, a moistened reducing agent such as calcium oxide and/or calcium hydroxide into the flue gas FG flowing through reactor 36. For this purpose, water W from a water supply 40 flows through a fluidly connected pipe 42 to fluidly connected distribution device 38. Likewise, reducing agent R from a reducing agent supply 44 is supplied through a fluidly connected duct 46 to fluidly connected distribution device 38.

Distribution device 38 comprises a container 48 essentially in the shape of an elongated box. Container 48 comprises a motor 50 and a mixer 52 for mixing together water W and reducing agent R supplied thereto from water supply 40 and reducing agent supply 44 to produce moistened reducing agent MR having a water content of approximately 1 percent to approximately 6 percent, or approximately 3 percent. Moistened reducing agent MR is uniformly distributed by the distribution device 38 into the fluidly connected reactor 36 in vertical portion 34 of gas duct 32, as described in further detail below. As such, moistened reducing agent MR may be continuously introduced into reactor 36 for uniform distribution and intermixing contact with the flue gas FG flowing therethrough. After intermixing contact with the flue gas FG, the resultant dry reacted reducing agent DR entrained by the flue gas FG enters a fluidly connected fabric filter FF module 54. Particulate matter including dry reacted reducing agent DR is collected in hoppers 56 of FF module 54 and transported through fluidly connected ducts 58 to fluidly connected container 48 for mixture with the moistened reducing agent MR therein. Alternatively, a portion of dry reacted reducing agent DR collected in hoppers 56 may be transported elsewhere for other purposes. Cleaned flue gases CG exit FF module 54 via fluidly connected duct 60 for release to the atmosphere via fluidly connected stack 16.

Figure 2:
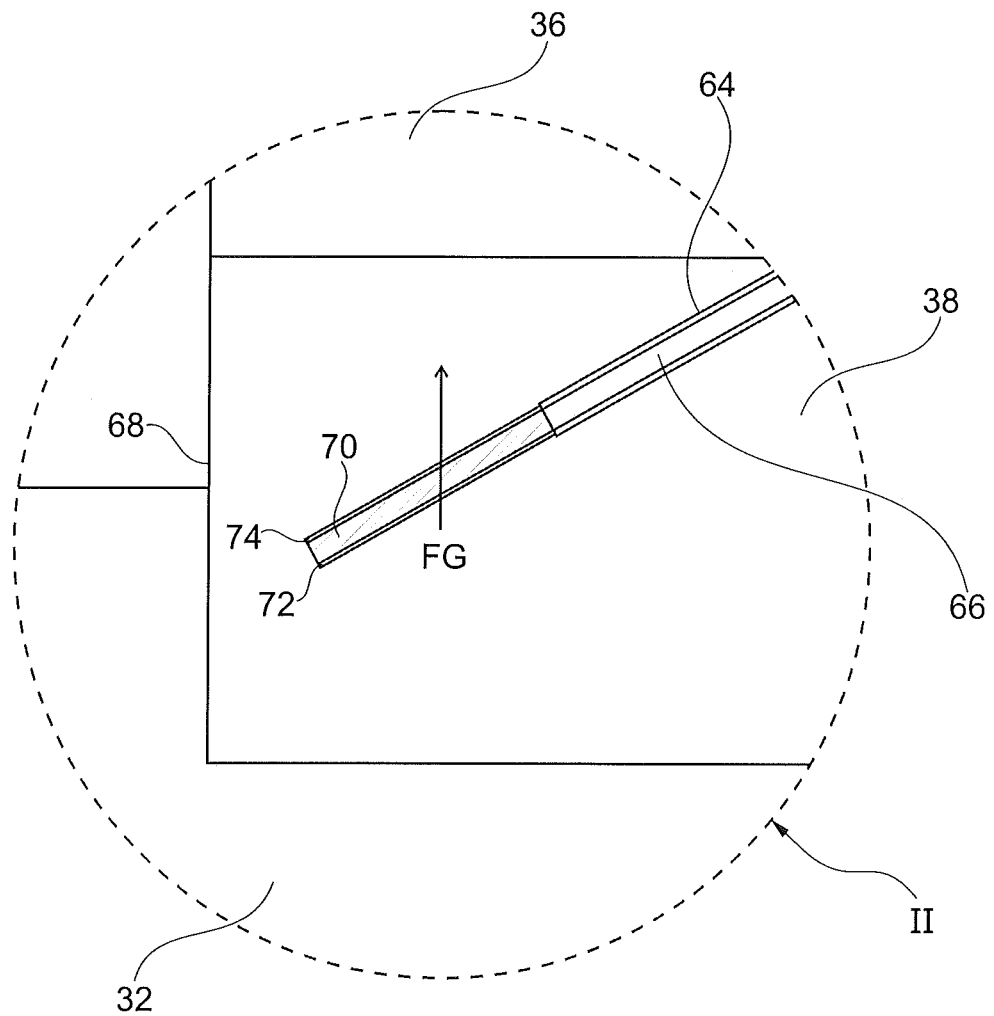
FIG. 2 is an enlarged schematic side cross sectional view of a portion of the distribution device in circled area II from FIG. 1 with a first embodiment of the low load distributor device in a retracted position.
Figure 3:
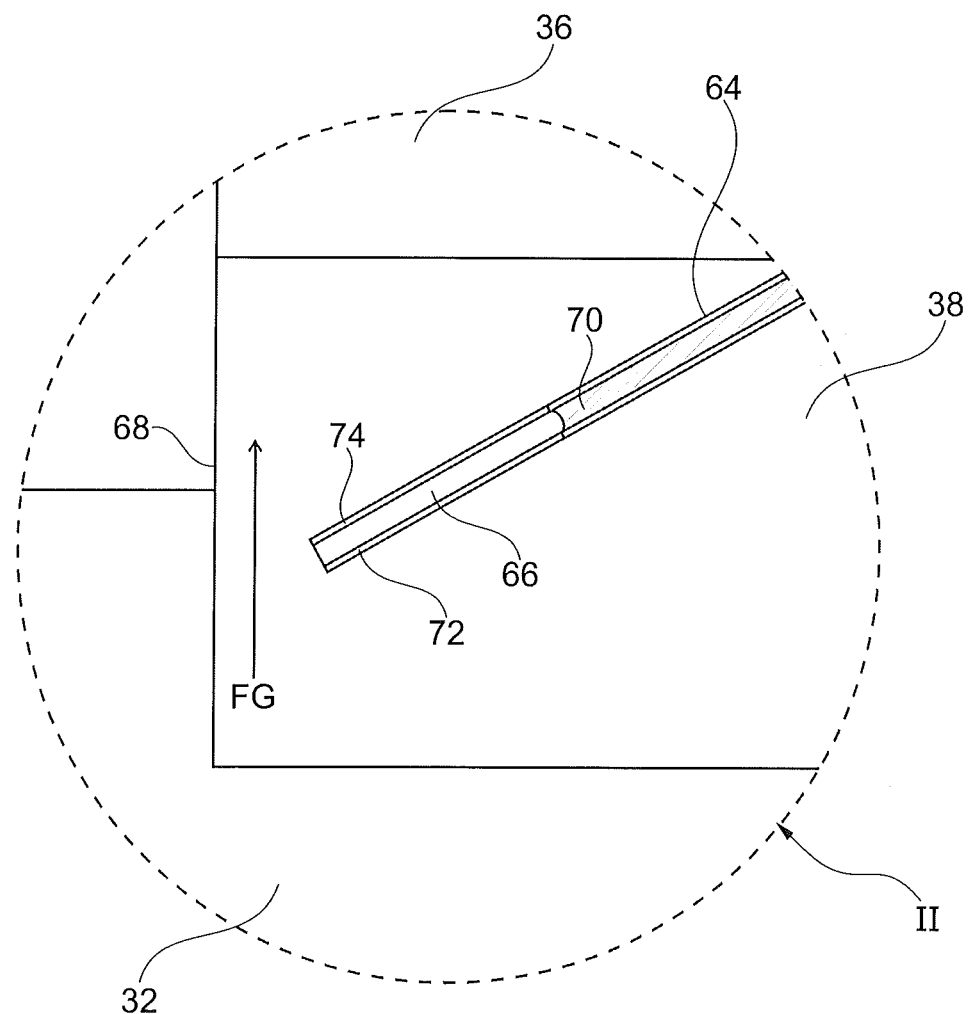
FIG. 3 is an enlarged schematic side cross sectional view of a portion of the distribution device in circled area II from FIG. 1 with the first embodiment of the low load distributor device in an extended position.

During periods of low demand, overall power plant 10 efficiency dictates reduced plant 10 production or turn down. Such periods of reduced plant 10 production are referred to as the plant 10 operating under "low load" conditions. Under low load conditions, less fuel F is combusted in the system boiler 12 and less flue gas FG is produced. With the production of less flue gas FG, less flue gas FG enters the reactor 36 thereby risking unstable reactor 36 operation and potential moistened reducing agent MR "fall out". Moistened reducing agent MR fall out occurs when the moistened reducing agent MR/flue gas FG dust column above the distribution device's 38 disperser plate 64 (FIG. 2) is unstable resulting in moistened reducing agent MR fall out from the flue gas FG rather than the moistened reducing agent MR being picked up and entrained in the flue gas FG for reaction and collection in the FF particulate collector 54. To stabilize flue gas FG flow through the reactor 36 during plant 10 low load operation, the distribution device 38 is equipped with an extendable and retractable distributor device 66, as best illustrated in FIG. 3. Under low load conditions, the extendable and retractable distributor device 66 extends outwardly toward the distant side 68 of the reactor 36 from beneath the distribution device's 38 disperser plate 64. As such, the distributor device 66 slides out from beneath disperser plate 64 within opposed side edge channels 70 formed within interior 72 of opposed elongated side edge support arms 74. Disperser plate 64 and/or distributor device 66 may optionally include one or more openings (not shown) for flue gas flow therethrough. When the distributor device 66 is positioned to extend outwardly toward the distant side 68 of the reactor 36, the distributor device 66 reduces flow area available for flue gas FG flow through reactor 36 thereby stabilizing the lessened load of flue gas FG flow through the reactor 36. As best illustrated in FIG. 2, during regular or relatively higher demand periods, when the plant 10 is operated under regular or relatively higher load conditions, the extendable and retractable distributor device 66 is retracted into a position beneath the disperser plate 64 of the distribution device 38. When the distributor device 66 is positioned in a retracted position beneath the disperser plate 64 of the distribution device 38, the flow area available for flue gas FG flow through reactor 36 is increased thereby stabilizing the greater load of flue gas FG flow through the reactor 36. The moistened reducing agent MR/flue gas FG dust column within the reactor 36 is thereby stabilized. As such, depending on plant 10 load, the distributor device 66 may be positioned to extend outwardly from the disperser plate 64, positioned to retract beneath the disperser plate 64, or positioned as needed therebetween to stabilize the reducing agent/flue gas dust column within the reactor 36. The subject distributor device 66 is operable manually, electronically, pneumatically, or driven by distribution device motor 50. Accordingly, regardless of plant 10 load conditions the subject AQCS system 14 with a NID DFGD system reactor 36 equipped with a low load distributor device 66 of the present disclosure maintains AQCS system 14 stability, efficiency and effectiveness.

Figure 4:
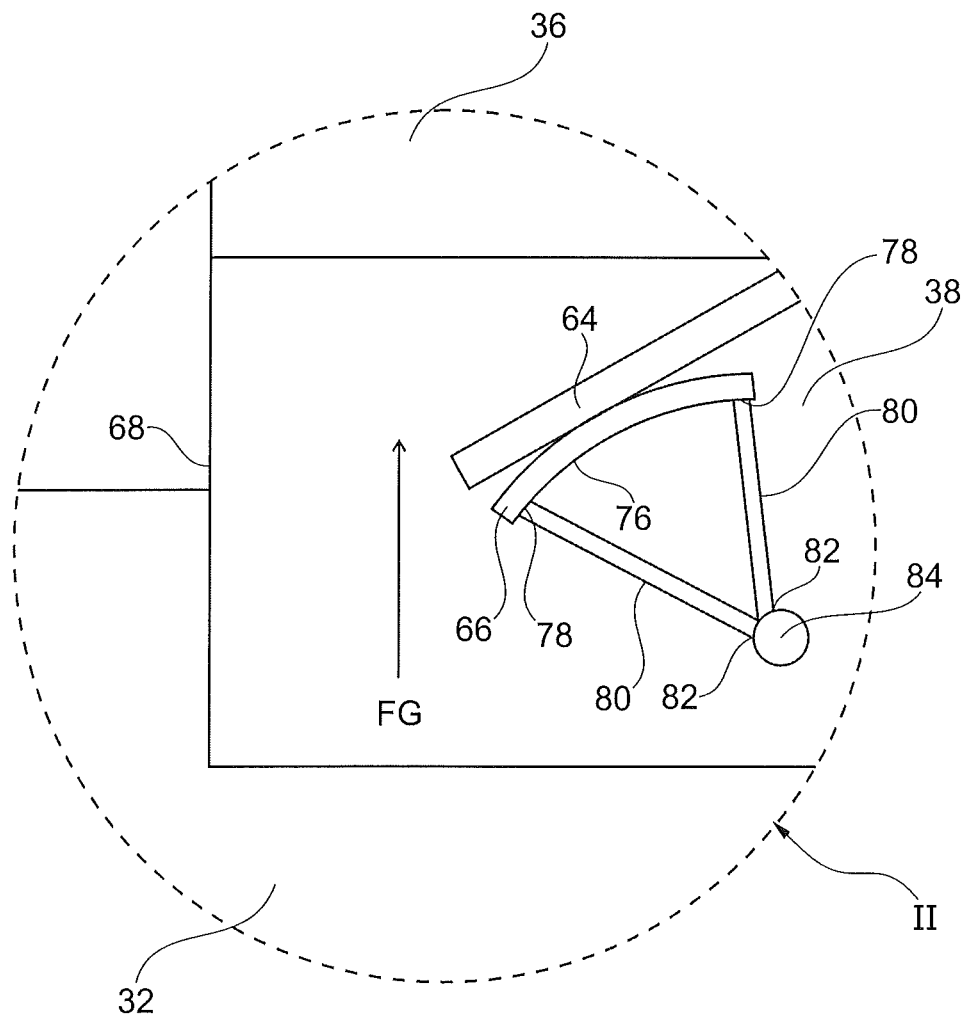
FIG. 4 is an enlarged schematic side cross sectional view of a portion of the distribution device in circled area II from FIG. 1 with a second embodiment of the low load distributor device in a retracted position.
Figure 5:
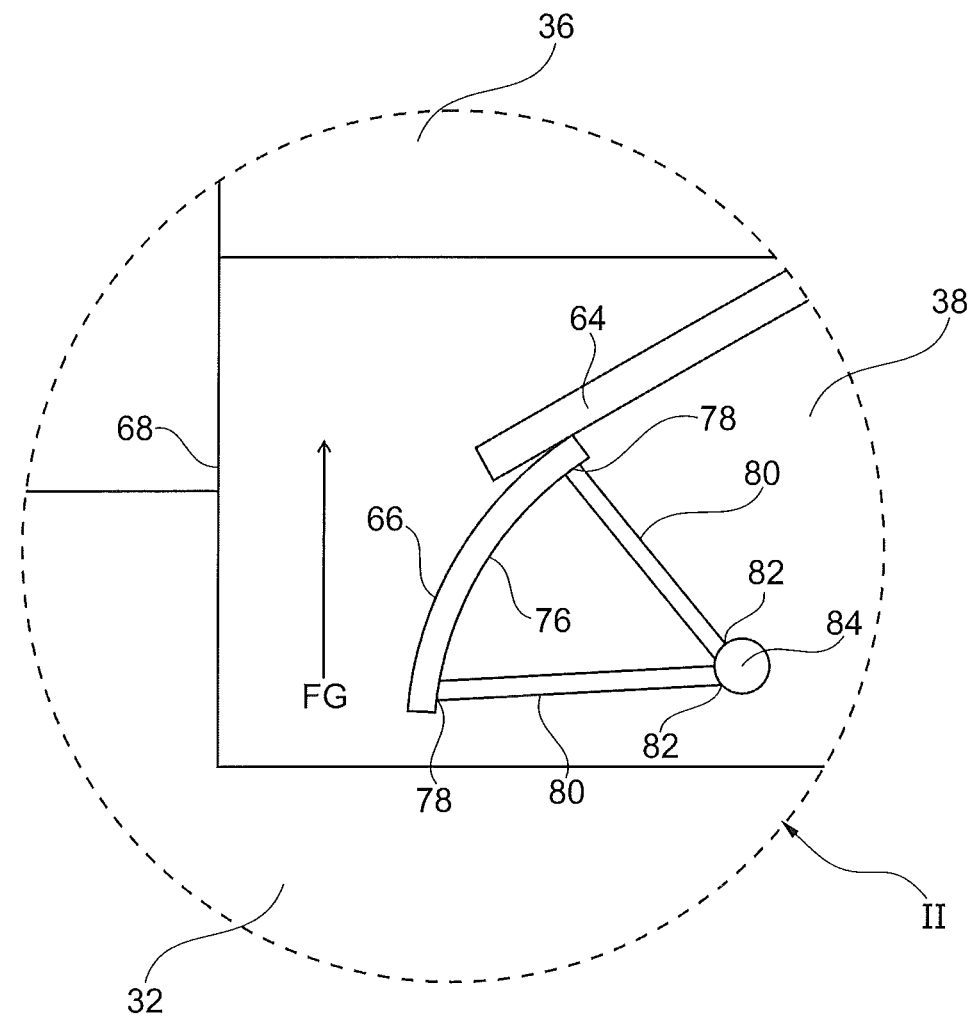
FIG. 5 is an enlarged schematic side cross sectional view of a portion of the distribution device in circled area II from FIG. 1 with the second embodiment of the low load distributor device in an extended position.

Best illustrated in FIG. 5 is another embodiment of the subject distributor device 66 useful to stabilize flue gas FG flow through the reactor 36 during plant 10 low load operation. Under low load conditions, the extendable and retractable distributor device 66 extends outwardly toward the distant side 68 of the reactor 36 from beneath the distribution device's 38 disperser plate 64. As such, the distributor device 66 slides out from beneath disperser plate 64. Interior side 76 of distributor device 66 is fixed to and supported by ends 78 of a plurality of spaced arm supports 80. Ends 82 of spaced arm supports 80, opposite ends 78 thereof, are rotatably fixed to elongated axil 84. Disperser plate 64 and/or distributor device 66 may optionally include one or more openings (not shown) for flue gas FG flow therethrough. When the distributor device 66 is positioned to extend outwardly toward the distant side 68 of the reactor 36, the distributor device 66 reduces flow area available for flue gas FG flow through reactor 36 thereby stabilizing the lessened load of flue gas FG flow through the reactor 36. As best illustrated in FIG. 4, during regular or relatively higher demand periods, when the plant 10 is operated under regular or relatively higher load conditions, the extendable and retractable distributor device 66 is rotated on elongated axis 84 for retraction into a position beneath the disperser plate 64 of the distribution device 38. When the distributor device 66 is positioned in a retracted position beneath the disperser plate 64 of the distribution device 38, the flow area available for flue gas FG flow through reactor 36 is increased thereby stabilizing the greater load of flue gas FG flow through the reactor 36. The moistened reducing agent MR/flue gas FG dust column within the reactor 36 is thereby stabilized. As such, depending on plant 10 load, the distributor device 66 may be positioned to extend outwardly from the disperser plate 64, positioned to retract beneath the disperser plate 64, or positioned as needed therebetween to stabilize the reducing agent/flue gas dust column within the reactor 36. The subject distributor device 66 is operable manually, electronically, pneumatically, or driven by distribution device motor 50. Accordingly, regardless of plant 10 load conditions the subject AQCS 14 with a NID DFGD system reactor 36 equipped with a low load distributor device 66 of the present disclosure maintains AQCS 14 stability, efficiency and effectiveness.

In summary, the present disclosure provides an AQCS 14 for treating flue gas FG produced in a combustion process to produce cleaned flue gas CG, that comprises a combustion boiler 12 arranged for flue gas FG flow to a dry flue gas desulfurization or dry scrubber reactor 36 equipped with a distribution device 38. A reducing agent R supply 44 is operable to supply a reducing agent R to the distribution device 38 of the dry flue gas desulfurization or dry scrubber reactor 36. A water W supply 40 is operable to supply water W to the distribution device 38 for mixing with the reducing agent R therein to produce a moistened reducing agent MR for distribution of the moistened reducing agent MR in the dry flue gas desulfurization reactor 36. A particulate removal device 54 is operable to remove dry reacted reducing agent DR from flue gas FG following contact of the flue gas FG with the moistened reducing agent MR in the reactor 36, to produce cleaned flue gas CG separated from dry reacted reducing agent DR. The produced cleaned flue gas CG is then released via a stack 16 to the environment.

Further, the present disclosure provides that the subject AQCS 14 for treating flue gas FG produced in a combustion process to produce cleaned flue gas CG comprises a moistened reducing agent MR distributor device 66 operable to extend outwardly from a distribution device 38 disperser plate 64 within a dry scrubber reactor 36 to reduce area available for flue gas FG flow through the dry scrubber reactor 36 when operated under low load conditions and operable to retract inwardly beneath the distribution device 38 disperser plate 64 within dry scrubber reactor 36 to increase area available for flue gas FG flow through the dry scrubber reactor 36 when not operated under low load conditions. As such, the distributor device 66 is operable to extend and retract from beneath the disperser plate 64 supported within opposed side edge channels 70 formed in an interior 72 of opposed elongated side edge support arms 74. Optionally, the disperser plate 64 may include one or more openings (not shown) therethrough for flue gas FG flow and/or the distributor device 66 may include one or more openings (not shown) therethrough for flue gas flow. According to another embodiment, the distributor device 66 is supported by a plurality of support arms 80 rotatably fixed to an axil 84, wherein the distributor device 66 is operable to extend and retract from beneath the disperser plate 64 by rotation of the plurality of support arms 80 about the axil 84. The subject distributor device 66 is operable manually, electronically, pneumatically, or driven by a distribution device motor 50.

A method of maintaining flue gas FG flow stability within a dry scrubber reactor 36 under differing load conditions comprises arranging a moistened reducing agent MR distributor device 66 within a dry scrubber reactor 36 operable to extend outwardly from a distribution device 38 disperser plate 64 to reduce area available for flue gas FG flow through the dry scrubber reactor 36 when operated under low load conditions and operable to retract inwardly beneath the distribution device 38 disperser plate 64 to increase area available for flue gas FG flow through the dry scrubber reactor 36 when not operated under low load conditions. As such, the distributor device 66 is operable to extend and retract from beneath the disperser plate 64 supported within opposed side edge channels 70 formed in an interior 72 of opposed elongated side edge support arms 74. Optionally, the disperser plate 64 may include one or more openings (not shown) therethrough for flue gas FG flow and/or the distributor device 66 may include one or more openings (not shown) therethrough for flue gas FG flow. According to another embodiment, the distributor device 66 is supported by a plurality of support arms 80 rotatably fixed to an axil 84 and operable to extend and retract from beneath the disperser plate 64 by rotation of the plurality of support arms 80 about the axil 84. As such, depending on plant 10 load, the distributor device 66 may be positioned to extend outwardly from the disperser plate 64, positioned to retract beneath the disperser plate 64, or positioned as needed therebetween to stabilize the reducing agent/flue gas dust column within the reactor 36. The distributor device 66 is operable manually, electronically, pneumatically or by distribution device motor 50.

Various system embodiments and methods have been described herein. The descriptions are intended to be illustrative. It will be apparent to one of skill in the art that modifications may be made to the embodiments as described without departing from the scope of the claims set forth below. For example, it is to be understood that although some of the embodiments have been described in the context of an AQCS of a particular arrangement, it should be appreciated that other arrangements may be used without deviation from the spirit and scope of the claims below.

The invention claimed is:

1. An air quality control system for treating flue gas produced in a combustion process to produce cleaned flue gas comprising:
   a moistened reducing agent distributor device operable to extend outwardly from a distribution device disperser plate within a dry scrubber reactor to reduce area of flue gas flow through the dry scrubber reactor when operated under low load conditions and operable to retract inwardly beneath the distribution device disperser plate within a dry scrubber reactor to increase area of flue gas flow through the dry scrubber reactor when not operated under low load conditions.

2. The system of claim 1, wherein the distributor device is operable to extend and retract from beneath the disperser plate supported within opposed side edge channels formed in an interior of opposed elongated side edge support arms.

3. The system of claim 1, wherein the disperser plate includes one or more openings therethrough for flue gas flow.

4. The system of claim 1, wherein the distributor device include one or more openings therethrough for flue gas flow.

5. The system of claim 1, wherein the distributor device is supported by a plurality of support arms rotatably fixed to an axil.

6. The system of claim 1, wherein the distributor device is supported by a plurality of support arms rotatably fixed to an axil and is operable to extend and retract from beneath the disperser plate by rotation of the plurality of support arms about the axil.

7. The system of claim 1 wherein the distributor device is operable manually, electronically, or pneumatically.

8. The system of claim 1 wherein operation of the distributor device is driven by a distribution device motor.

9. A method of maintaining flue gas flow stability within a dry scrubber reactor under differing load conditions comprising:
   arranging a moistened reducing agent distributor device within a dry scrubber reactor operable to extend outwardly from a distribution device disperser plate to reduce area of flue gas flow through the dry scrubber reactor when operated under low load conditions and operable to retract inwardly beneath the distribution device disperser plate to increase area of flue gas flow through the dry scrubber reactor when not operated under low load conditions.

10. The method of claim 9, wherein the distributor device is operable to extend and retract from beneath the disperser plate supported within opposed side edge channels formed in an interior of opposed elongated side edge support arms.

11. The method of claim 9, wherein the disperser plate includes one or more openings therethrough for flue gas flow.

12. The method of claim 9, wherein the distributor device includes one or more openings therethrough for flue gas flow.

13. The method of claim 9, wherein the distributor device is supported by a plurality of support arms rotatably fixed to an axil.

14. The method of claim 9, wherein the distributor device is supported by a plurality of support arms rotatably fixed to an axil and operable to extend and retract from beneath the disperser plate by rotation of the plurality of support arms about the axil.

15. The method of claim 9, wherein the distributor device is operable manually, electronically, pneumatically or by a distribution device motor.

\* \* \* \* \*